United States Patent
Park

(10) Patent No.: US 8,625,402 B2
(45) Date of Patent: Jan. 7, 2014

(54) DEVICE AND METHOD FOR WRITING DATA TO AN OPTICAL DISC

(71) Applicant: Sang-jun Park, Seoul (KR)

(72) Inventor: Sang-jun Park, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/723,481

(22) Filed: Dec. 21, 2012

(65) Prior Publication Data

US 2013/0163396 A1     Jun. 27, 2013

(30) Foreign Application Priority Data

Dec. 23, 2011    (KR) .......................... 10-2011-0141707

(51) Int. Cl.
*G11B 7/00*     (2006.01)

(52) U.S. Cl.
USPC ..... 369/116; 369/47.5; 369/53.26; 369/59.11

(58) Field of Classification Search
None
See application file for complete search history.

(56) References Cited

U.S. PATENT DOCUMENTS

2001/0024459 A1*    9/2001  Seo et al. ................. 372/29.021

FOREIGN PATENT DOCUMENTS

| KR | 10-2007-0081388 | 8/2007 |
| KR | 10-2008-0046997 | 5/2008 |
| KR | 10-2010-0020595 | 2/2010 |

OTHER PUBLICATIONS

Korean Office Action issued Nov. 28, 2012 in counterpart Korean Patent Application No. 10-2011-0141707 (4 pages, in Korean).

* cited by examiner

*Primary Examiner* — Muhammad N Edun
(74) *Attorney, Agent, or Firm* — NSIP Law

(57) ABSTRACT

Provided are a method of optical writing on a disc and a device adopting the method. The method of optical writing includes initially driving a laser diode (LD) at a preset reference value corresponding to a target output, detecting an actual output power by monitoring light output by the LD, and comparing the actual output power to the target output power. The method further includes compensating the reference value and writing data to the optical disc using the compensated reference value.

13 Claims, 4 Drawing Sheets

DEVICE AND METHOD FOR WRITING DATA TO AN OPTICAL DISC

CROSS-REFERENCE TO RELATED APPLICATION(S)

This application claims the benefit under 35 USC §119(a) of Korean Patent Application No. 10-2011-0141707, filed on Dec. 23, 2011, in the Korean Intellectual Property Office, the entire disclosure of which is incorporated herein by reference for all purposes.

BACKGROUND

1. Field

The following description relates to a method of writing on an optical disc and a device adopting the method, and more particularly, to a method of compensating for writing power.

2. Description of Related Art

Data is typically written to an optical disc using a preset power. However, during the writing process, the initial writing power may differ from a preset power due to various factors including variations in the surrounding temperature. Generally, during a writing process, an overshoot appears during the early stage of the writing process. The overshoot is a peak of power that is higher than an optimal writing power. The overshoot is typically compensated for using an automatic power control (APC) which occurs during the writing process. Accordingly, the writing process reaches the optimal writing power after the writing process is performed for an extended length of time.

Generally, an overshoot in writing power can damage a disc. For example, an overshoot that appears before the writing process reaches an optimal writing power may form abnormal pits in a disc as a result of the excessive writing power. Such abnormal pits may deteriorate the quality of written data. Accordingly, there is a desire to reduce overshoot during the early stage of a writing process to improve the quality of written data.

SUMMARY

In an aspect, there is provided a method of writing data to an optical disc, the method including initially driving a laser diode (LD) at a preset reference value corresponding to a target output power for writing data to an optical disc, detecting an actual output power by monitoring light output by the LD, comparing the actual output power to the target output power and compensating the preset reference value based on the comparison, and writing data to the optical disc by driving the LD using the compensated reference value.

The method may further comprise obtaining lead-in information of the optical disc before the LD is initially driven.

During the initially driving of the LD, the LD may be controlled such that light from the LD is not focused on the optical disc.

The preset reference value of the target output power may be set by a manufacturer of the optical disc.

The detecting of the actual output power and the compensating of the preset reference value may be repeatedly performed a plurality of times.

The compensating of the reference value may further comprise obtaining a characteristic function indicating changes of actual output powers of the LD according to changes of the reference value.

The preset reference value of the target output power may be included in a look-up table that is stored in a memory of an optical disc drive which writes data to the optical disc.

In an aspect, there is provided an optical writing device including an optical pickup unit comprising an object lens facing an optical disc and a laser diode (LD) configured to emit light, a light detecting device configured to monitor light that is output by the LD, an LD driver configured to supply a driving voltage to the LD to drive the LD at a preset reference value corresponding to a preset target output power with respect to the optical disc, and a central control unit configured to control the LD driver according to outputs monitored by the light detecting device, to monitor an actual light output by the LD, to compare the actual light output power to the preset target output power, to compensate the preset reference value based on the comparison, and to drive the LD driver using the compensated reference value such that data is written to the optical disc.

The central control unit may be further configured to control the optical pickup unit to obtain lead-in information of the optical disc before the LD is initially driven.

While the LD is initially driven, the object lens may be controlled such that light from the LD is not focused on the optical disc.

The preset reference value of the target output power may be set by a manufacturer of the optical disc.

The detection of the actual output power and the compensation of the reference value may be repeatedly performed a plurality of times.

The central control unit may be further configured to obtain a characteristic function indicating changes of actual output powers of the LD according to changes of the reference value.

The preset reference value of the target output power may be included in a look-up table that is stored in a memory of the optical writing device.

The optical writing device may further comprise an actuator for driving the object lens, and the central control unit may be further configured to control the actuator to transport the object lens to a point, such that light from the LD is not focused by the object lens on the optical disc.

Other features and aspects may be apparent from the following detailed description, the drawings, and the claims.

Figure 1:
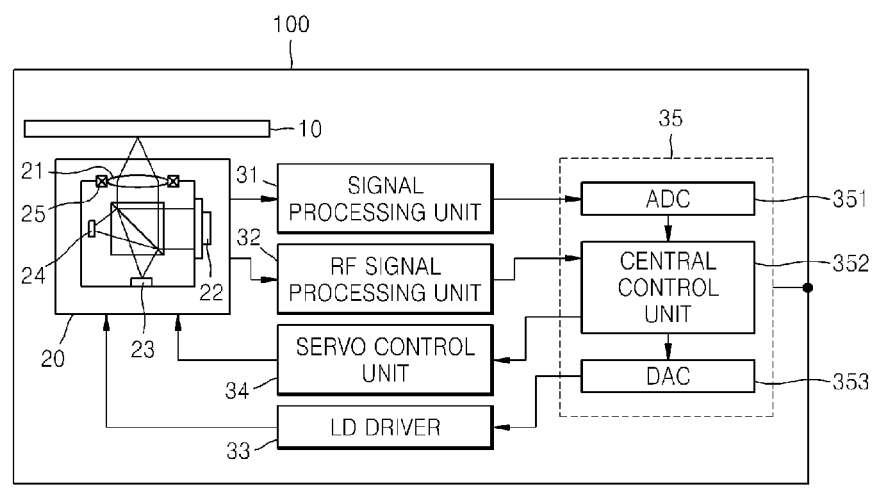
FIG. 1 is a diagram illustrating an example of an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical disc drive 100.

Referring to FIG. 1, the optical disc drive 100 includes an optical pickup unit 20 which reads and writes data from and to a disc 10. The optical pickup unit 20 includes an optical system and a mechanical system. The optical system may include an object lens 21 facing the disc 10, a laser diode (LD) 22 that is a light source for irradiating light to the disc 10, a main light detecting device 23 which detects signals reflected by the disc 10, and a monitoring light detecting device 24 which monitors light power from the LD 22. Furthermore, the mechanical system may include an electromagnetic-based actuator 25 which performs a focusing operation and tracking operation of the object lens 21.

In this example, the LD 22 is connected to a LD driver 33, the monitoring light detecting device 24 is connected to a signal processing unit 31, and the main light detecting device 23 is connected to an RF signal processing unit 32. The LD driver 33 may include an automatic power control (APC) for controlling power of the LD 22. The APC may compensate target output power by supplying a compensated current to the LD 22. The amount of compensation may determined by the monitoring light detecting device 24 based on a current output power.

The actuator 25 is connected to a servo control unit 34. The servo control unit 34 may control the actuator 25 based on a tracking error (TE) signal and a focus error (FE) signal obtained from the RF signal processing unit 32, so that the object lens 21 is focused and tracked.

A central control unit 352 may process the signals from the signal processing unit 31 and the RF signal processing unit 32 and may transmit a control signal to the LD driver 33 and the servo control unit 34. For example, the central control unit 352 may be included in a DSP 35 together with an analog-to-digital converter (ADC) 351 and a digital-to-analog converter (DAC) 353. Generally, the DSP 35 may include digital processing units, such as encoder/decoder for processing data obtained by RF signals.

According to various aspects, when data is to be written to a disc, an optical pickup unit may generate a preset analog output control signal by adjusting gains at the signal processing unit 31. The analog control signal may be converted to a digital signal by the ADC 351. A gain of the digital signal may be adjusted at the central control unit 352, such that the digital signal corresponds to a final target output power, and the digital signal with the adjusted gain may be converted to an analog signal by the DAC 353. An output from the DAC 353 may be transmitted to an APC of the LD driver 33, and a current with respect to an LD may be determined based on the same.

When data is to be written to a disc, an optical writing device may detect an actual output power of an LD by initially driving the LD at a reference value corresponding to a preset writing power, compare a detection result to a target output power, and compensate the reference value based on a comparison result. The compensated reference value is a signal from the central control unit 352 that may be used to obtain the target output power, so that the target output power is obtained during an actual writing process.

For example, actual output power of an LD is detected by initially driving the LD at a preset reference value (reference voltage) corresponding to a preset target output power used for writing data to an optical disc. The actual output power is compared to the target output power, and the reference value is compensated, such that the actual output power becomes similar to or equal to the target output power. The LD is driven by controlling the LD driver based on the compensated reference value. For example, the compensated reference value or a compensated property function may be used only for a single writing process, and, when a writing process to a new disc is started, the preset reference value or a preset property function may be compensated again as described above.

According to various aspects, an optical writing device may include an optical pickup having an object lens that faces an optical disc and an LD that emits light, an optical detecting unit that monitors output from the LD, an LD driver that applies an operating voltage to the LD, and a central control unit. The central control unit may control the LD driver based on an output monitored by the optical detecting unit.

As an example, when data starts to be written to an optical disc, the central control unit drives a LD at a reference value corresponding to a preset writing power with respect to the optical disc. The central control unit compensates the reference value based on a result of comparing an actual light output power and the preset light output power, and transmits the compensated reference value to the LD driver to operate the LD based on the compensated reference value. After the compensation of the reference value is performed, data starts to be written to the optical disc. While data is being written to the disc, output power is controlled in real time by performing optimum power control (OPC).

The reference value is generally referred to as a DAC value converted by the DAC 353. The central control unit 352 determines compensation of a gain by comparing an actual output power and a target output power, and the DAC 353 outputs a DAC value, which includes a determination result.

Figure 2:
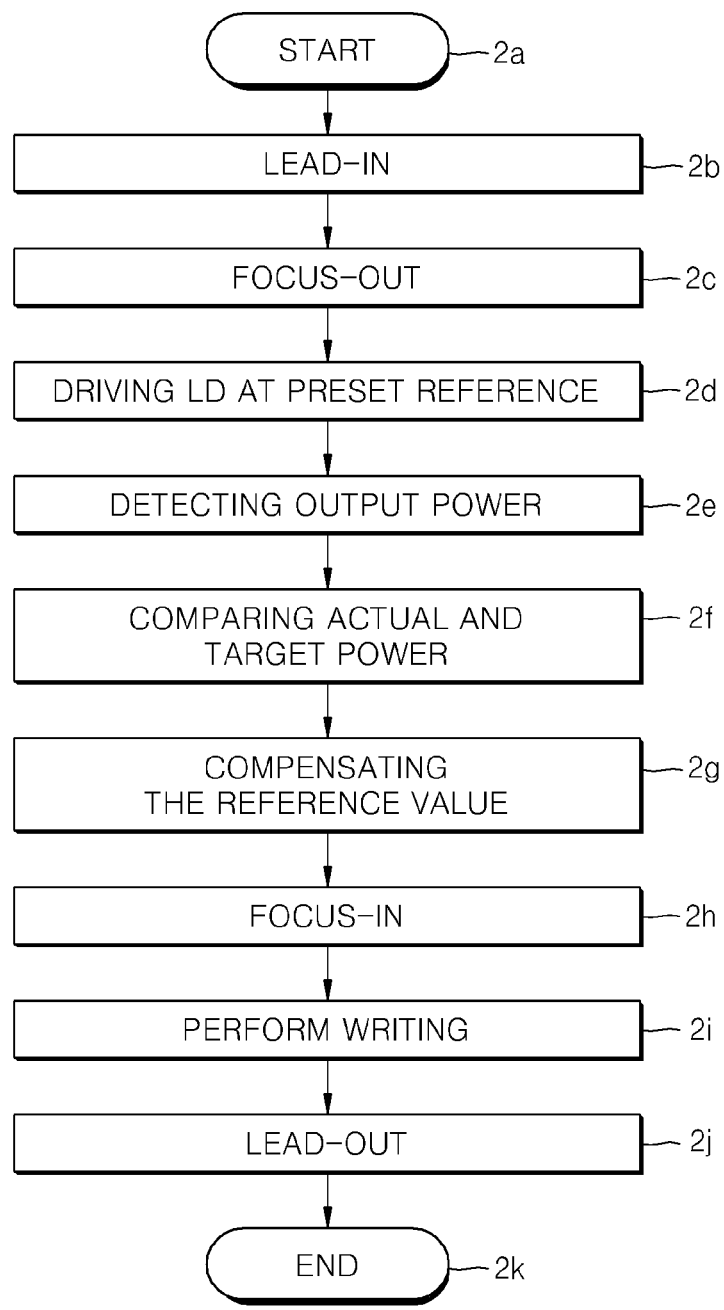
FIG. 2 is a diagram illustrating an example of a method for optical writing.

An example of a method of writing data to a disc is shown in FIG. 2. The procedure shown in FIG. 2 will be described below with reference to the optical writing device shown in FIG. 1.

Referring to FIG. 2, when a data writing process to a disc is started (operation 2a), a lead-in process is performed on a blank disc (operation 2b) to obtain disc information that is used for the data writing process, such as a type of the disc. In response, the object lens 21 of the optical pickup unit 20 is transported to be out of focus with respect to the disc 10, that is, to a focus-out point (operation 2c).

The actuator 25 operated by a servo control unit 41 may transport the object lens 21 to the focus-out point. Next, an LD may be driven by controlling an LD driver at a preset reference value corresponding to the disc 10 (operation 2d). When the LD starts emitting light, actual output power of the LD may be measured using a monitoring light detecting device 24 (operation 2e). Next, the actual output power obtained via the monitoring light detecting device 24 is compared with a preset target output power to analyze a difference between the preset target output power and the actual output power (operation 2f). The reference value is compensated using a result of the analysis (operation 2g). The reference value may be compensated such that the actual output power reaches the target output power.

According to various aspects, operations 2d through 2g may be performed for a plurality of number of times with different reference values. For example, a function indicating output power characteristic of the LD may be figured out by detecting actual output powers corresponding to different reference values. Furthermore, such a function may be compared to a preset characteristic function based on target output powers corresponding to preset reference values, and thus, a compensated characteristic function may be obtained.

As described herein, after a reference value or a characteristic function is compensated, an object lens is transported to a focus-in point (operation 2h), and actual data writing operation is performed on the disc (operation 2i). During the actual data writing operation (operation 2h), optimal output power may be maintained by performing APC. After the actual data writing operation (operation 2i), lead-out information may be written to the optical disc and the optical writing process may be terminated (operation 2k).

In general, writing powers differ according to types of discs and writing speeds. For example, the higher writing density and the writing speed are, typically the higher the writing power becomes. The writing power may be determined based on data writing options with respect to a disc and may be selected based on DAC values corresponding to a preset target power.

Generally, DAC values include a reading power reference value DAC1, a deleting power reference value DAC2, and a writing power reference value DAC3, which may be used as reference voltages Vref of an operational amplifier arranged at a gain adjusting circuit of a monitoring light detecting device. The values may be initial values set by a vendor and may be stored in the form of a look-up table in a memory device (not shown), such as an EEPROM.

According to various aspects, overshoot that appears during the early stage of the writing process may be reduced by compensating initial DAC values such as those set by a vendor based on an actual output power before an optical writing operation. For example, the vendor may be a manufacturer of the disc.

Figure 3:
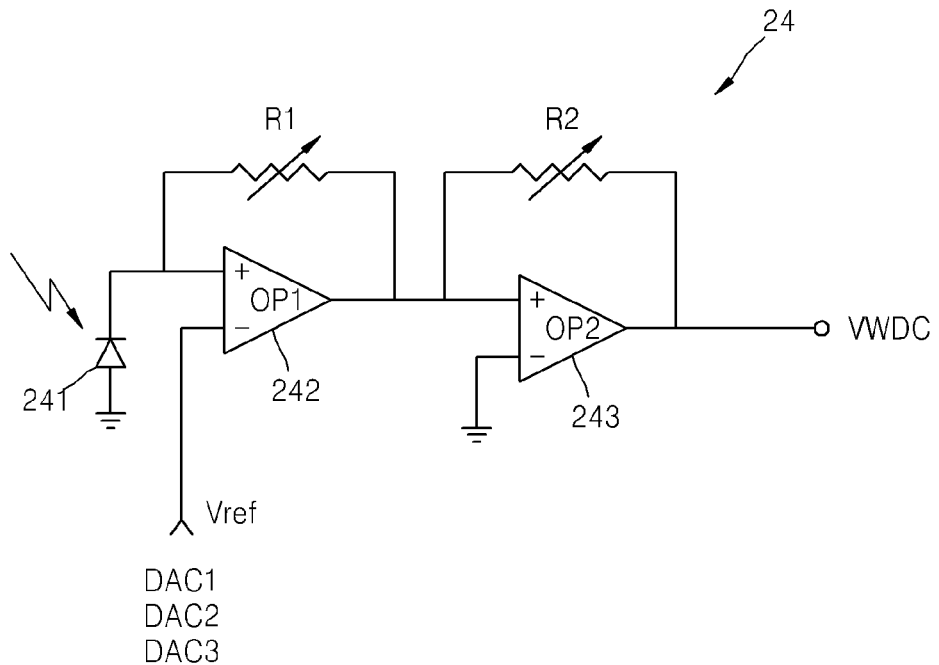
FIG. 3 is a diagram illustrating an example of a monitoring light detecting device that includes a gain adjusting circuit.

FIG. 3 illustrates an example of the monitoring light detecting device 24 having a gain adjusting circuit. Referring to FIG. 3, the monitoring light detecting device 24 has a one-chip structure in which a photodiode 241, a first operational amplifier 242, and a second operational amplifier 243 are arranged. The photodiode 241 receives an incident light. A voltage corresponding to power of the light may be induced at a cathode of the photodiode 241.

The first operational amplifier 242 may determine a voltage induced at the cathode of the photodiode 241 as a first input signal and a predetermined reference voltage Vref as a second input signal and may output a difference between the first input signal and the second input signal. The reference voltage Vref is the reference value DAC1, DAC2, or DAC3 that is applied by the DAC 353, which is determined by the DSP 35 or the central control unit 352.

In this example, the first and second operational amplifiers 242 and 243 are respectively combined with feedback resistors R1 and R2 for adjusting gains. The first operational amplifier 242 may compare the reference voltage Vref to the voltage induced at the cathode of the photodiode 241 and may output a comparison result to the second operational amplifier 243, and the second operational amplifier 243 may generate a writing voltage signal VWDC by amplifying the same and may output the writing voltage signal VWDC to the LD driver 33. The LD driver 33 supplies a current corresponding to the writing voltage signal VWDC to the LD 22.

Figure 4:
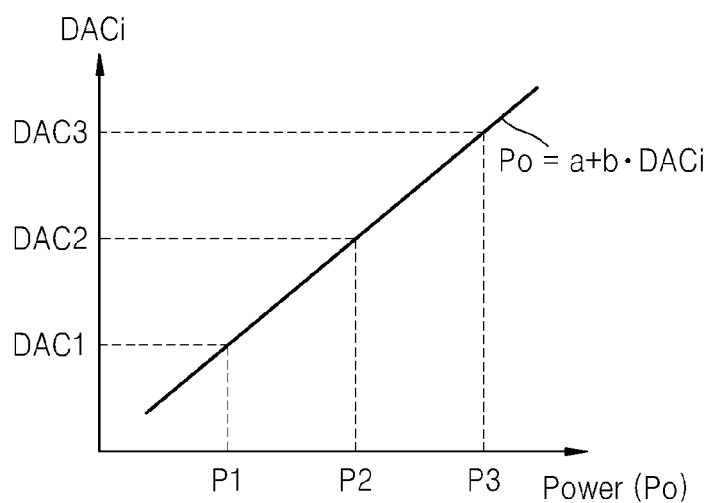
FIG. 4 is a graph illustrating an example of changes of a laser diode output power according to changes of a reference value.

FIG. 4 illustrates an example of a characteristic function graph showing changes of an LD output power Po according to changes of a reference value DACi.

Referring to FIG. 4, in the characteristic function Po=a+b·DACi, 'a' is a constant number, whereas 'b' is a slope affected by changes of environments, such as a temperature. In the characteristic function, the constant number 'a' and the slope 'b' may be determined during a manufacturing process under a particular environment condition (generally room temperature) by measuring a plurality of output powers respectively corresponding to a plurality of reference values. The slope 'b' may vary sensitively according to surrounding environments, such as a temperature, and is one of the factors that causes an actual power to differ from a target power under environment conditions that are different from the environment conditions during the manufacturing process.

For example, if an optical writing device is used in an environment with a temperature different from the temperature at which preset values are set during a manufacturing process, an actual output power may be off (generally less than) a target output power. According to various aspects, an actual output power that is similar to a target output power may be acquired by obtaining a characteristic function set during a manufacturing process and a characteristic function before an actual writing operation. Accordingly, a difference between an actual output power and a target output power due to changes of environments as described above may be reduced, and thus initial overshoot may be reduced.

Figure 5:
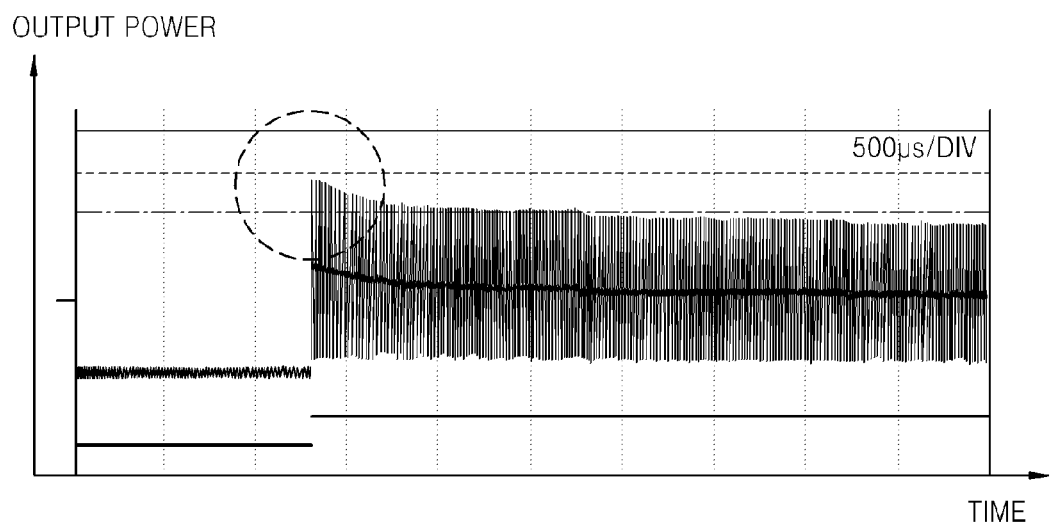
FIG. 5 is a graph illustrating an example of a change of light outputs during the early stage of the writing process in a related art.
Figure 6:
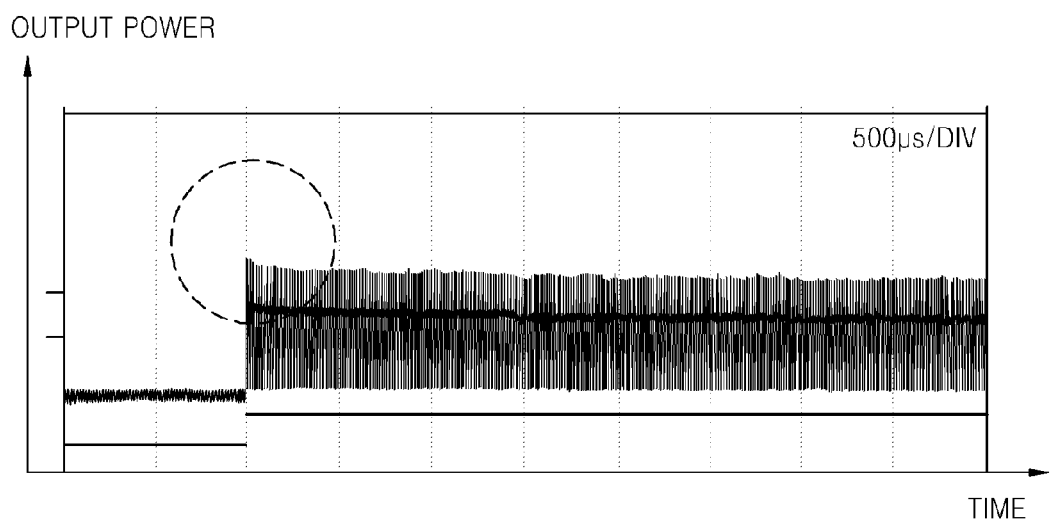
FIG. 6 is a graph illustrating an example of a change of light outputs during the early stage of the writing process according to various aspects herein.

According to various aspects, before an actual writing operation, an actual output power may be detected by driving an LD at a preset reference value. In this example, the actual output power may be compared to a target output power. A correlation between a DAC reference value and a light output power is shown in the Equation of FIG. 4. Accordingly, a compensated reference may be obtained based on the correlativity, and the actual writing operation may be performed using the compensated reference value. FIGS. 5 and 6 illustrate examples of changes of light outputs during the early stage of the writing process in the related art and according to various aspects, respectively.

FIG. 5 illustrates an example of light outputs in the related art, that is, light outputs in a case where an LD is driven by using a reference value set during a manufacturing process. FIG. 6 illustrates an example of light outputs in a method according to various aspects, that is, light outputs after a reference value set during a manufacturing process is compensated.

Referring to FIGS. 5 and 6, the overshoots (inside dotted line circles) appear at early stages of light outputs in both cases. As shown FIG. 5, a sharp and large peak power appears in the related art, whereas as shown FIG. 6, a significantly smaller peak power appears. In other words, written information may be defective due to the peak power at the early stage of a writing operation in the related art, whereas data may be written to ensure good quality according to the technology described herein.

According to various aspects, before data is actually written to an optical disc, an actual output power may be detected by driving an LD with a reference voltage. The reference voltage may be compensated by comparing the actual output power to a preset target output power. As a result, overshoot, which tends to appear at the early stage of a writing operation, may be reduced thus reducing the deterioration of quality of initially written data.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of writing data to an optical disc, the method comprising:
   initially driving a laser diode (LD) at a preset reference value corresponding to a target output power of a writing operation for writing data to the optical disc, prior to performing the writing operation on the optical disc;
   detecting an actual output power by monitoring light output by the LD during the initially driving of the LD, wherein the LD is controlled so that light from the LD is not directed towards the optical disc during the detecting;
   comparing the actual output power to the target output power and compensating the preset reference value based on the comparison; and
   writing data to the optical disc by driving the LD using the compensated reference value to perform the writing operation.

2. The method of claim 1, further comprising obtaining lead-in information of the optical disc before the LD is initially driven.

3. The method of claim 1, wherein the preset reference value of the target output power is set by a manufacturer of the optical disc.

4. The method of claim 1, wherein the detecting of the actual output power and the compensating of the preset reference value are repeatedly performed a plurality of times.

5. The method of claim 1, wherein the compensating of the reference value further comprises obtaining a characteristic function indicating changes of actual output powers of the LD according to changes of the reference value.

6. The method of claim 1, wherein the preset reference value of the target output power is included in a look-up table that is stored in a memory of an optical disc drive which writes data to the optical disc.

7. An optical writing device comprising:
   an optical pickup unit comprising an object lens facing an optical disc and a laser diode (LD) configured to emit light;
   a light detecting device configured to monitor light that is output by the LD;
   an LD driver configured to supply a driving voltage to the LD to initially drive the LD at a preset reference value corresponding to a preset target output power of a writing operation for writing data to the optical disc, prior to performing the writing operation on the optical disc; and
   a central control unit configured to control the LD driver according to outputs monitored by the light detecting device, to monitor an actual light output by the LD, to compare the actual light output power to the preset target output power, to compensate the preset reference value based on the comparison, and to drive the LD driver using the compensated reference value such that data is written to the optical disc to perform the writing operation,
   wherein the light detecting device detects an actual output power by monitoring light output by the LD during the initially driving of the LD, and the central control unit controls the LD so light from the LD is not directed towards the optical disc during the detecting.

8. The optical writing device of claim 7, wherein the central control unit is further configured to control the optical pickup unit to obtain lead-in information of the optical disc before the LD is initially driven.

9. The optical writing device of claim 7, wherein the preset reference value of the target output power is set by a manufacturer of the optical disc.

10. The optical writing device of claim 7, wherein the detection of the actual output power and the compensation of the reference value are repeatedly performed a plurality of times.

11. The optical writing device of claim 7, wherein the central control unit is further configured to obtain a characteristic function indicating changes of actual output powers of the LD according to changes of the reference value.

12. The optical writing device of claim 7, wherein the preset reference value of the target output power is included in a look-up table that is stored in a memory of the optical writing device.

13. The optical writing device of claim 7, further comprising an actuator for driving the object lens,
   wherein the central control unit is further configured to control the actuator to transport the object lens to a point, such that light from the LD is not focused by the object lens on the optical disc.

* * * * *